United States Patent [19]

Schiethart

[11] 3,732,448
[45] May 8, 1973

[54] SYNCHRONOUS ELECTRIC MOTOR
[75] Inventor: Lodewijk Schiethart, Dubbeldam, Netherlands
[73] Assignee: N.V. Electromotorenfabriek Dordt, Dordrecht, Netherlands
[22] Filed: Apr. 6, 1971
[21] Appl. No.: 131,596

Related U.S. Application Data
[63] Continuation-in-part of Ser. No. 2,195, Jan. 12, 1970, Pat. No. 3,614,496.

[30] Foreign Application Priority Data
Apr. 22, 1970 Netherlands......................70/05797

[52] U.S. Cl..................................310/162, 310/211
[51] Int. Cl................................................H02k 12/00
[58] Field of Search......................310/162, 163, 164, 310/165, 179, 180, 183, 185, 187, 216, 218, 212, 213, 214, 264, 265, 114, 113, 112; 318/138

[56] References Cited
UNITED STATES PATENTS
3,171,049 2/1965 Jarrett..................................310/114
3,560,820 2/1971 Unnewehr..............................310/163
3,535,572 10/1970 DeRugeris............................310/185
3,510,699 5/1970 Fredrickson..........................310/114
3,169,203 2/1965 Lavin....................................310/162

Primary Examiner—R. Skudy
Attorney—Snyder and Butrum

[57] ABSTRACT

A polyphase synchronous A C motor having rectangular wave power input includes a stator having axially spaced core members, a D. C. winding between the core members and a polyphase winding extending through the core members. The rotor has two squirrel cage sections, one aligned within each core member and each squirrel cage section carries a pole piece. Each pole piece has a pair of diametrically opposed radially projecting poles and the poles of one pole piece are displaced 90° with respect to the poles of the other pole piece. The motor has a total of four circumferentially spaced poles and thus presents a pole pitch of 90° for each phase. The polyphase winding has at least one winding per phase. In one embodiment the poles have a circumferential width ( 90°) equal to the pole pitch and the polyphase windings have a like circumferential width. In another embodiment the poles have a circumferential width ( 60°) which is two-thirds of the pole pitch and, again, the polyphase windings have a like circumferential width.

4 Claims, 5 Drawing Figures

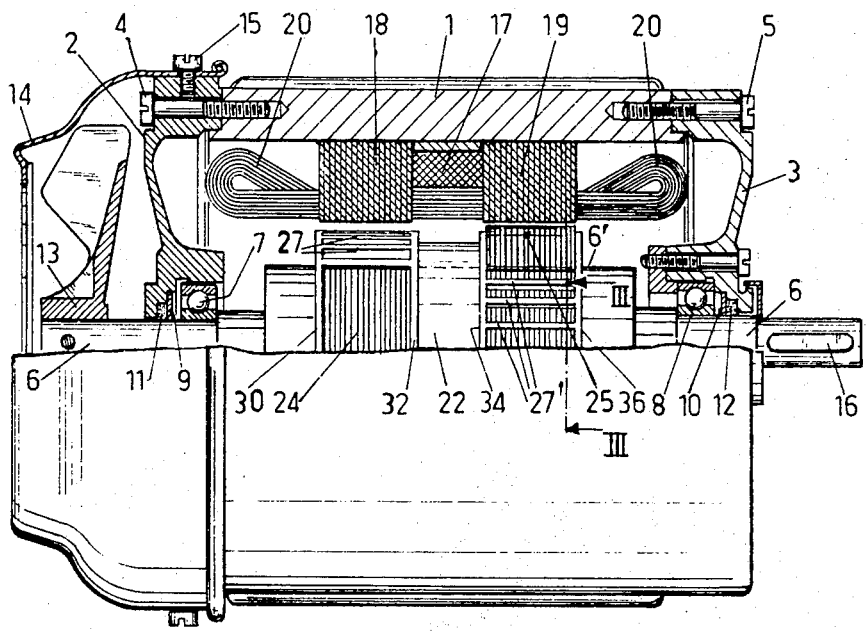
FIG.1
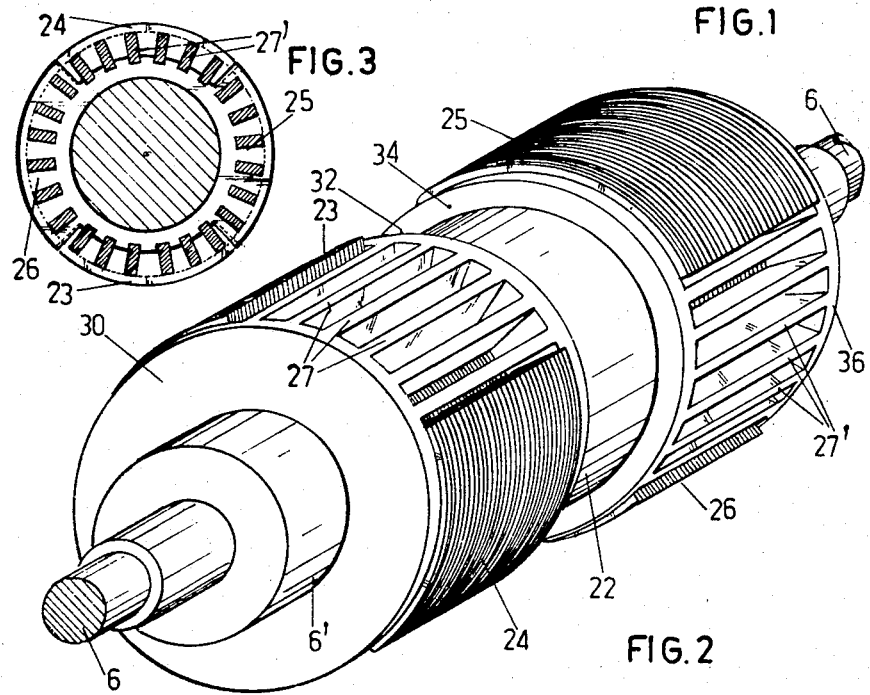
FIG.3
FIG.2
INVENTOR
LODEWIJK SCHIETHART

SYNCHRONOUS ELECTRIC MOTOR

CROSS REFERENCE TO RELATED APPLICATION

This application is a continuation-in-part of my copending application Ser. No. 2,195 filed Jan. 12, 1970 claiming priority of Dutch application No. 69.0084 of Jan. 17, 1969 which copending application is now U.S. Pat. No. 3,614,496 issued Oct. 19, 1971.

The invention relates to a synchronous electric motor comprising a stator provided with a polyphase winding and a winding for producing a coaxial d.c. field and a rotor whose poles are disposed in two axially spaced transverse planes.

In a motor of this type, it is desirable that the form of the voltage induced by the poles in the polyphase winding should correspond as far as possible to that of the supply voltage. If this is not so and one voltage, for example, is a square wave and the other a sine wave, higher harmonic compensating currents will form and produce an extra power consumption. If the motor is under load, the compensating current in comparison with the total current is relatively smaller than in the zero load condition. In processes, for example, in the textile industry, in which the motors operate under zero load conditions for a relatively considerable part of the operating time, the compensating current will constitute a relatively high percentage of the total current and the total power consumption is therefore adversely affected.

One solution of this problem would be to adapt the form of the supply voltage, but this would require complicated steps which would increase the costs. The above problem arises particularly when the motor is supplied from static frequency converters. In the simplest construction, a converter of this type delivers a square-wave voltage.

The object of the invention is to provide a motor of the above described type which can be supplied with a square-wave voltage and which produces only minor compensating currents under zero-load conditions.

To this end, according to the invention, the pole width is substantially equal to the pole pitch. This results in a motor in which a square-wave voltage can be produced in the polyphase winding. The above step can readily be put into effect in a motor in which the poles are disposed in axially spaced planes in comparison with a motor in which this is not the case. In a motor in which the poles are situated in one plane, it would be impossible to carry out the step according to the invention, because the rotor poles would be in contiguous relationship and the poles could not then be referred to as separate poles. The problem does not arise, however, in a motor in which the poles are situated in different axially spaced planes. The step according to the invention gives the greatest advantage in a motor in which the polyphase winding is constructed with one groove per pole and per phase.

As a second solution for achieving the object according to the invention, the pole width can be approximately two-thirds of the pole pitch, in which case the polyphase winding is constructed with two coils per groove, and the width of each coil is reduced by one-third with respect to the pole pitch.

The invention will be explained in detail with reference to a drawing illustrating one exemplified embodiment.

FIG. 1 is a longitudinal section through a motor with four poles according to the invention;

FIG. 2 is a perspective view of the rotor of the motor according to the invention;

FIG. 3 is a section on the line III—III in FIG. 1 and

Figure 4:
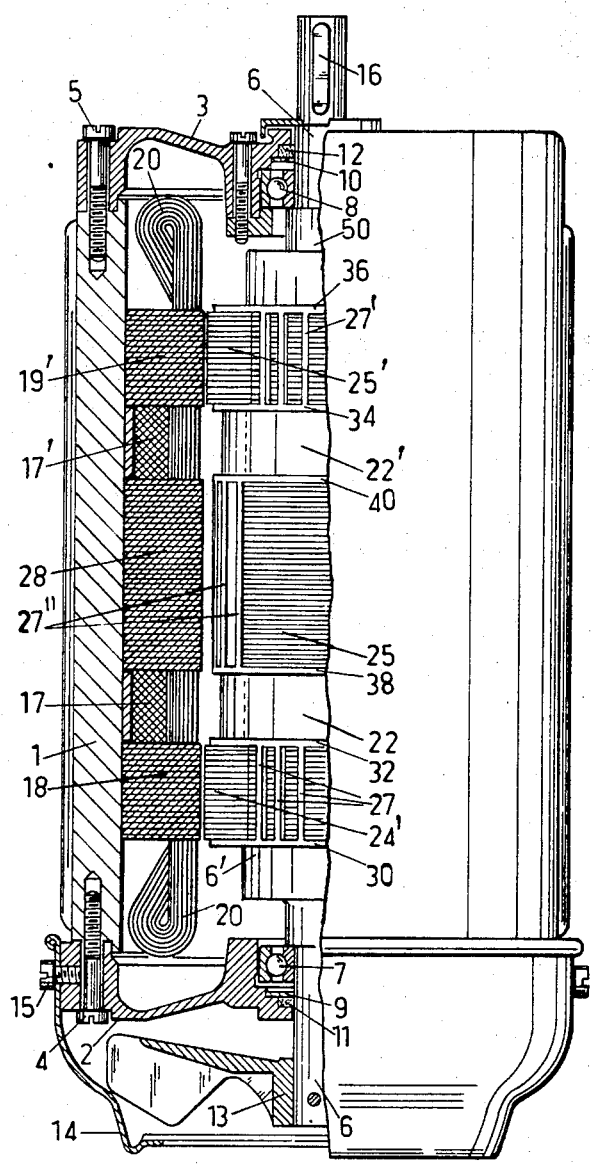
FIG. 4 is a longitudinal section of a variant.

The stationary part or stator of the motor includes a substantially cylindrical housing 1 provided at opposite ends with shields 2 and 3 which are connected to the housing 1 by means of bolts 4, 5 respectively. The shields 2 and 3 are provided with openings for the passage of the rotor shaft 6 which is rotatably supported in the shields 2 and 3 respectively by ball bearings 7, 8. The latter are closed by rings 9 and 10 respectively. A felt dust seal 11 is provided between the ring 9 and the shield 2 and a felt dust seal 12 is provided between the ring 10 and the shield 3. That end of the shaft to the left as viewed in the drawing is provided with a blade wheel 13 which acts as a fan device and blade wheel 13 is shielded by a plate 14 which is fastened to the housing 1 by means of bolts 15. The opposite end of the shaft is provided with a keyway 16. The d.c. winding 17 excites the motor. On both sides of a space ring member enclosing the winding 17, laminated core structures 18 and 19 are provided bearing a polyphase winding 20. This polyphase winding 20 is composed of coils or groups of coils whose dimensions in the peripheral direction correspond substantially to the pole pitch of different polarity. An alternating or rotating field is produced by means of this winding 20.

The two end portions of the shaft 6 consist of non-magnetic material while the intermediate portion 6', which has an enlarged diameter, consists of magnetic material. Laminated poles provided with squirrel cages are mounted on the intermediate portion in two axially spaced planes. The cage with the bars 27 to the left as viewed in the drawing is bounded axially by rings 30 and 32 respectively, while the bars 27' of the righthand squirrel cage terminate in the rings 34 and 36 respectively.

Laminations forming a pole are provided between each pair of rings. Each set of laminations comprises an annular main body portion and one or more radially projecting portions forming the actual poles 23, 24 and 25, 26 respectively. According to the invention, the width of these poles is equal to the pole pitch, and this means that the corresponding points of a pole in one plane are situated on substantially the same axial line as those points of a pole in the other axially offset plane. The poles in one plane are offset by 90° with respect to those in the other plane.

The outside of the main body of the poles is notched to receive the inner portions of the bars 27 and 27'. The axial width of the poles correspond to that of the associated core members 18 and 19. A spacer ring 22 of magnetic material is mounted between the two poles on the intermediate portion 6' and maintain the required distance between the poles.

During operation, the concentric exciting winding 17 conducts a direct current and produces an axially directed d.c. field in the housing and the shaft, closing through the core structure of the stator at the poles. The polarity of the poles depends on the direction of this field. In addition to the above-mentioned low power consumption, particularly at zero load, an important advantage of the motor is that a controllable field can be obtained without co-rotating windings and slip rings and brushes.

FIG. 4, in which like parts have been given the same reference numerals as in FIG. 1, illustrates a modification in the arrangement and position of the exciting winding. Two axially spaced exciting windings 17 and 17' are provided laterally of a central common stator core structure 28. Three corresponding poles 24', 25 and 25' are disposed within the three stator core structures, the middle pole 25 and the associated middle core structure 28 having a double axial width and hence being dimensioned for a double flux. Rods 27, 27'' and 27' respectively are disposed between the end plates 30/32, 38/40 and 34/36. This construction is suitable particularly for higher powers and is to be used whenever the outside diameter of the motor is subject to limitations. Clearly, a construction with more than three stator core structures and poles is possible instead of three stator core structures and poles.

As mentioned, the coils or windings are so constructed as to provide one groove per pole and per phase. Thus for a three phase system with four poles as in FIGS. 1-3, there would be 12 grooves. Moreover, since the coils or windings are of the same circumferential width as are the poles, there will be only one winding associated with each groove in this embodiment.

Figure 5:
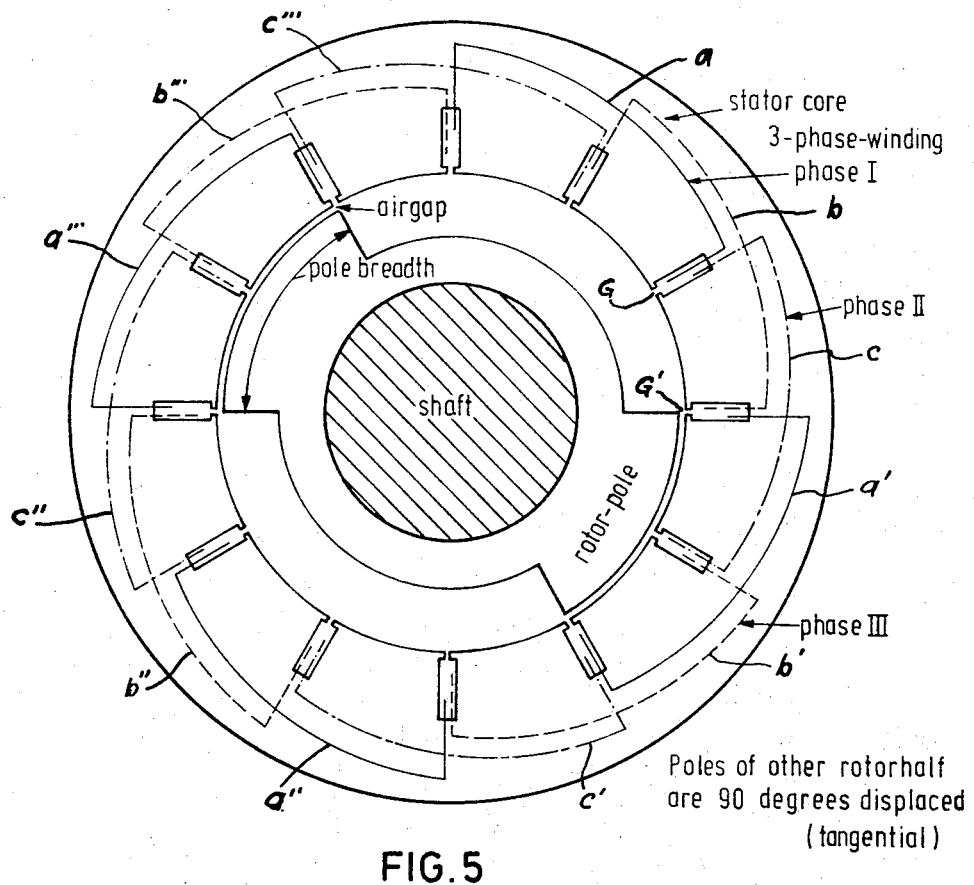
FIG. 5 is a cross section illustrating that embodiment wherein the pole width or circumferential breadth is two-thirds of the pole pitch.

If, however, two windings are associated with each groove as is shown in FIG. 5, the pole width or breadth is reduced to two-thirds of the pole pitch, as shown. For example, phase I coil $a$ and phase III coil $c$ are associated with the groove G; phase II coil $b$ and phase III coil $c$ are associated with the groove G' and so on for the several phase I, II and III windings $a, a', a'', a'''$; $b, b', b'', b'''$; and $c, c', c'', c'''$, respectively.

What I claim is:

1. A synchronous A.C. motor comprising, in combination:
    a housing having at least a pair of axially spaced core members disposed therein;
    D.C. winding means disposed between said core members for establishing a closed D.C. magnetic field extending axially within said housing and passing radially through said core members;
    polyphase winding means extending through said core members and circumferentially of said housing for establishing a rotating magnetic field within said housing;
    a rotor journalled in said housing concentrically of said core members and said winding means, said rotor including a shaft, squirrel cage winding means fixed to said shaft and including circumferentially spaced electrically conducting rods and remote end plates disposed in planes substantially straddling said core members, and a pair of pole pieces within the confines of said squirrel cage winding means and each pole piece having a plurality of radially projecting and uniformly circumferentially spaced poles with the radially projecting poles of one pole piece being displaced circumferentially with respect to the poles of the other pole piece to lie in alignment with the spaces thereof;
    said polyphase winding means comprising a plurality of circumferentially spaced coils for each phase with each coil having a width in the peripheral direction around said rotor substantially equal to the pole pitch and each pole having substantially the same peripheral width as the coils.

2. A synchronous A.C. motor comprising, in combination:
    a housing having at least a pair of axially spaced core members disposed therein;
    D.C. winding means disposed between said core members for establishing a closed D.C. magnetic field extending axially within said housing and passing radially through said core members;
    polyphase winding means extending through said core members and circumferentially of said housing for establishing a rotating magnetic field within said housing;
    a rotor journalled in said housing concentrically of said core members and said winding means, said rotor including a shaft, squirrel cage winding means fixed to said shaft and including circumferentially spaced electrically conducting rods and remote end plates disposed in planes substantially straddling said core members, and a pair of pole pieces within the confines of said squirrel cage winding means and each pole piece having a plurality of radially projecting and uniformly circumferentially spaced poles with the radially projecting poles of one pole piece being displaced circumferentially with respect to the poles of the other pole piece to lie in alignment with the spaces thereof;
    said polyphase winding means comprising a plurality of circumferentially spaced coils for each phase with each coil having a width in the peripheral direction around said rotor substantially equal to two-thirds of the pole pitch and each pole having substantially the same peripheral width as the coils.

3. A synchronous motor as defined in claim 1 wherein said pole pitch is 90°.

4. A synchronous motor as defined in claim 2 wherein said pole pitch is 90°.

* * * * *